W. J. PRICE.
RAKE.
APPLICATION FILED JULY 25, 1913.

1,079,264.

Patented Nov. 18, 1913.

Inventor
W. J. Price
By Victor J. Evans
Attorney

Witnesses

UNITED STATES PATENT OFFICE.

WILLIAM J. PRICE, OF BIRMINGHAM, ALABAMA, ASSIGNOR OF ONE-HALF TO OSCAR REINHART, OF BIRMINGHAM, ALABAMA.

RAKE.

1,079,264.

Specification of Letters Patent.

Patented Nov. 18, 1913.

Application filed July 25, 1913. Serial No. 781,265.

*To all whom it may concern:*

Be it known that I, WILLIAM J. PRICE, a citizen of the United States, residing at Birmingham, in the county of Jefferson and State of Alabama, have invented new and useful Improvements in Rakes, of which the following is a specification.

This invention relates to rakes, and it has for its object to provide a cleaning attachment which may be readily applied to a rake of ordinary construction and which shall be simple in construction and easily applied.

A further object of the invention is to produce a cleaning attachment which shall be made up from a single piece of resilient sheet metal and which may be mounted on a rake without the necessity for special fastening means.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

Figure 1:
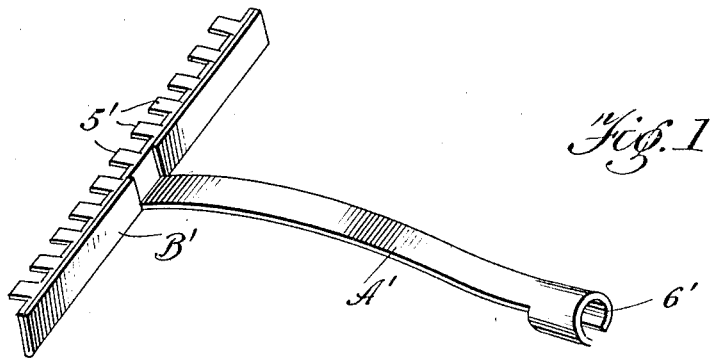
Figure 2:
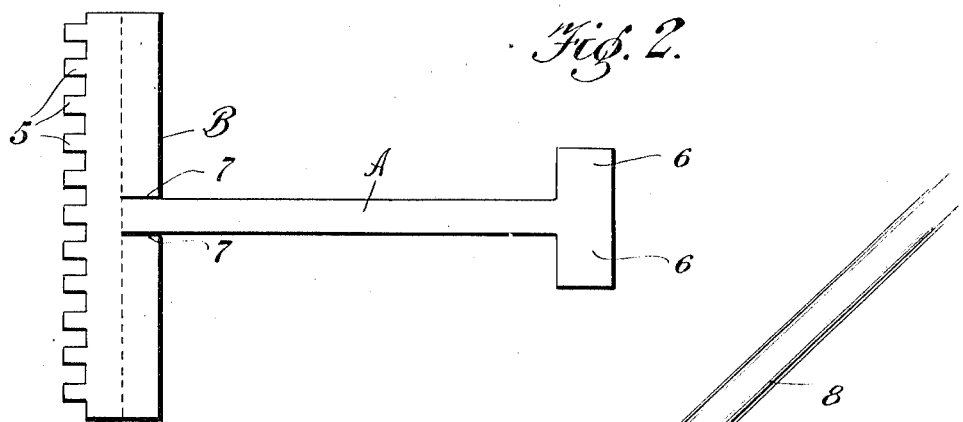
Figure 3:
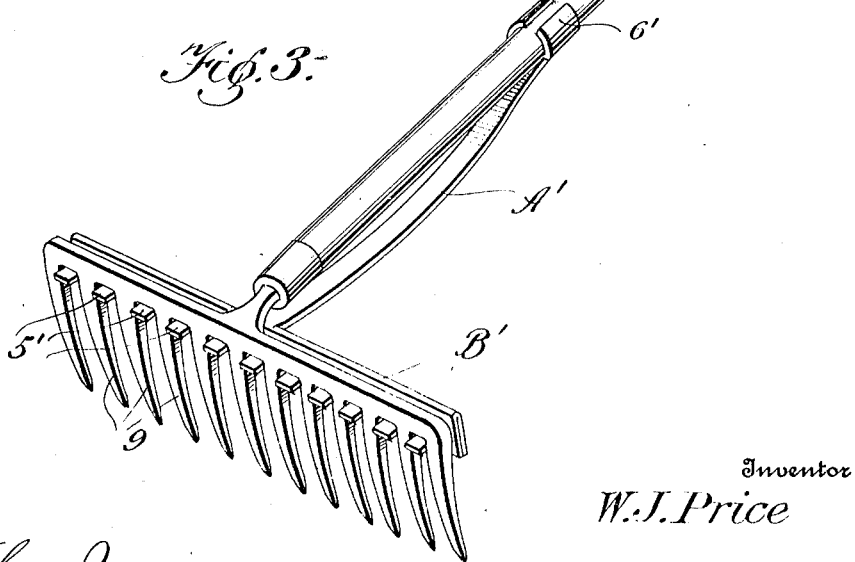

In the drawing,—Figure 1 is a perspective view of the improved cleaning attachment. Fig. 2 is a plan view showing a blank from which the device may be manufactured. Fig. 3 is a perspective view showing the device applied to an ordinary rake in position for operation.

Corresponding parts in the several figures are denoted by like characters of reference.

The improved device may be struck from a substantially T-shaped blank formed of resilient sheet metal and comprising a stem A and a head or cross bar B. The latter is provided along its forward edge with a series of spaced projections 5, and the stem is provided at the end distant from the head with lateral projections 6. Incisions 7 are formed in the head or cross bar adjacent to the juncture with the stem.

The cross bar B is doubled on itself, as clearly seen in Figs. 1 and 3, and the projections 5 are bent substantially at right angles to the head to form forwardly extending teeth. The stem A is likewise bent substantially at right angles to the head, thus constituting a handle portion A' which includes the material originally lying between the incisions 7 in the blank, said handle portion being joined with one longitudinal edge of the head B', and the teeth 5' being disposed along the opposite edge of said head. The extensions 6 and that portion of the stem which is located therebetween are bent to form an arcuate clip 6'.

In practice, the improved device is applied to a rake by simply adjusting the clip 6' on the rake handle 8 in such a position that the cleaner teeth 5' will extend between the rake teeth 9. The resiliency of the handle portion 8 may be increased by slightly arching the same in the direction of its length, as clearly seen in Figs. 1 and 3. The cleaner teeth 5' will thus be held normally between the bases of the rake teeth. The rake is used in the customary manner; when rubbish accumulates upon the rake teeth, it may be discharged by simply tapping the rake teeth on a stone or the like, or the rake may be simply held by the operator in an elevated position and smartly shaken in a downward direction when the head of the cleaner will be projected downwardly in the direction of the points of the rake teeth, causing the rubbish to be removed from between the latter by the action of the cleaner teeth.

The improved device is extremely simple and inexpensive in construction and may be readily applied to any ordinary rake without the necessity for screws, clips or the like.

It is obvious that the device may be manufactured in various dimensions and proportions to fit rakes of various sizes.

Having thus described the invention, what is claimed as new, is:—

1. A rake cleaning attachment consisting of a single piece of resilient sheet metal of substantially T-shape, the cross bar of which is provided with spaced projections and the stem with lateral extensions; the cross bar being doubled on itself to form a head, the projections and the stem being bent substantially at right angles to the head, and the portion of the stem including